United States Patent Office 3,244,281
Patented Apr. 5, 1966

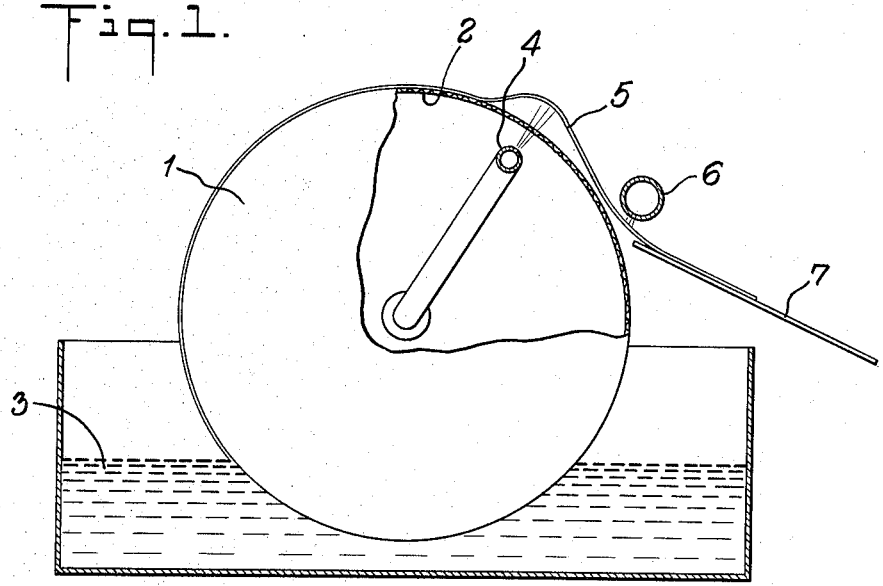
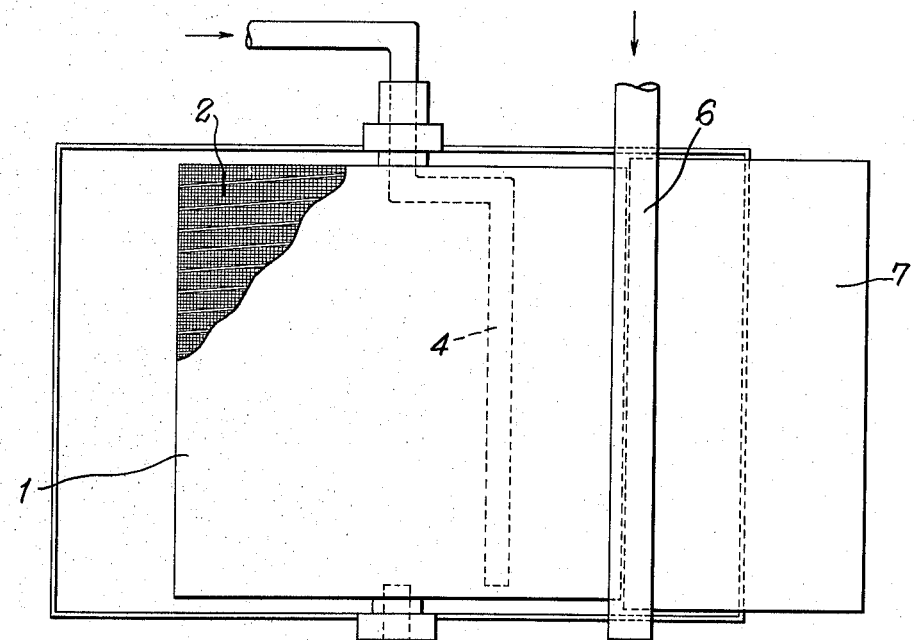
INVENTORS
EDUARD KURZ
HERBERT REINECKE
BY
D. Malcolm
ATTORNEY

3,244,281
PROCESS FOR SEPARATING SOLIDS FROM SUSPENSIONS
Eduard Kurz, Stockach, near Marktl (Inn), and Herbert Reinecke, Burghausen, Upper Bavaria, Germany, assignors to Wacker-Chemie G.m.b.H., Munich, Germany, a corporation of Germany
Filed Oct. 17, 1961, Ser. No. 145,611
3 Claims. (Cl. 210—67)

This invention relates to separating solids from suspensions by using suction cell filters and removing filter cakes from such suction cell filters and it has for its object to provide a novel and improved process for this purpose.

Another object of the invention is to provide a simple and efficient process for separating solids from suspensions and removing filter cakes which may be considerably thinner than the filter cakes which previously known processes have been able to remove from suction cell filters.

Various other objects and advantages will be apparent as the nature of the invention is more fully disclosed.

The performance of a suction cell filter depends upon the speed of its rotation; when the number of revolutions increases, the capacity of the filter also increases. In the process the filter cake gets thinner and thinner, and its removal becomes more difficult.

It is known to remove the cakes from suction filters by means of rollers, strings or scrapers. Often a blast of compressed air on the cake from the interior of the filter is employed for assistance. For the processing of suspensions of solid matter with very small particles, for instance polyvinyl chloride dispersions with size 1μ, removal by the above methods is feasible only if the cake is not too thin. Most frequently a minimum cake thickness of 3 mm. is required. The capacity of the suction filter would increase considerably if it were possible to remove the thin cakes of 0.3-3 mm. forming at higher filter speeds of rotation.

We have now discovered a process for removing thin cakes from suction cell filters, in which the filter cake is loosened from inside by compressed air. The process is characterized by the fact that a filter cake with a thickness of 0.1-5 mm., particularly 0.5-2 mm., is loosened from inside by compressed air of 0.01-0.2 atm. over (excess) pressure, preferably below 0.1 atm. overpressure, and in addition it is blown off from outside. In carrying out the process it is advantageous to conduct the compressed air over jets or nozzles.

In the accompanying drawing, FIG. 1 is a diagrammatic longitudinal section through an apparatus suitable for carrying out the process of the invention; and FIG. 2 is a plan view of said apparatus.

In the drawing, a suction cell filter 1 of usual construction, covered with a nylon filter cloth 2, is immersed to a depth of about 25% in a dispersion 3 of, say, polyvinyl chloride. A blast of compressed air is directed upon the filter cloth 2 from inside by any suitable means, such as the jets 4, in order to loosen up the filter cake 5. To remove the cake, air is blown from outside from a cake blow-off pipe 6 against the filter cloth 2, and the cake is taken off by means of a suitable baffle or baffles 7. Additional use of any suitable cake knocking or rapping mechanism which transmits a vibrating motion to the cake, and use of an increase in the temperature of the suspension of solid materials, can also contribute to an increase in capacity.

Example 1

(a) A polyvinyl chloride dispersion with PVC particles of 0.3–3μ, predominantly size 2μ, a solid content of 45% and a temperature of 45° C. is filtered on a suction cell filter with a surface area of 2 sq. meters covered with a nylon cloth, the filter being immersed to a depth of about 25% in the dispersion. To facilitate the removal of the cake one uses a blast of compressed air (0.08 atm. overpressure) from inside the drum on the filter cloth. In order to withstand this pressure of the blast of compressed air, a 1.5 mm. diameter wire is wound around the filter cloth. The cake which is 2 mm. thick, is taken off by means of a scraper which touches the filter drum as closely as possible. At a circumferential speed of the suction filter of 1.67 cm./sec., 39 kg. of PVC with a water content of 23.7% are removed by the scraper per hour. The cake removal is not complete. Increased circumferential speed decreases the capacity considerably due to too thin cake formation which is no longer removed by the scraper. Decreased circumferential speed of 1.3 cm./sec. gives the same result as at 1.67 cm./sec.

During processing of a PVC dispersion with a temperature of 15° C. using the same work method, only 30 kg. of PVC with a water content of 23.5% come off the filter per hour.

(b) If a pipe is fixed above the above-mentioned scraper with orifices of 2 mm. diameter at intervals of 2 cm., and compressed air of 4 atm. over (excess) pressure is conducted into such pipe, the air will flow out through the orifices onto the cake. This results in complete cake removal even in cases where the thickness of the cake is only 2 mm. The scraper can now be removed farther away from the filter and only serves as a baffle or guide plate for the blown-off product. At a circumferential speed of the filter of 1.67 cm./sec. and a temperature of the PVC dispersion of 45° C. the filter capacity increases to 56.2 kg. of PVC per hour with a water content of 23.3%. When the filter circumferential speed is increased to 2.7 cm./sec., 80 kg. of PVC with a water content of 23.6% are obtained per hour. Thus the capacity of the filter is doubled in comparison with the above comparative test (a) and the life of the filter cloth is lengthened many times. Preferably the blow-off angle from outside is directed upon the filter cake, is 80–100°.

Example 2

A dispersion of PVC with particle size of mostly 1μ is processed. The temperature of the dispersion is 60° C. The filter whose filter cloth is wound by a wire 0.5 mm. thick is equipped in addition with a cake rapping or knocking mechanism which transmits a vibrating motion to the cake. At a circumferential speed of the filter of 1.33 cm./sec. without using the cake rapping mechanism and without blow-off by air from outside, the scraper removes after prior cake loosening by compressed air blast from inside 21.5 kg. of PVC per hour with a water content of 22.5%. Increased circumferential speed of the filter causes thinner cake formation which is associated with a capacity decrease of the filter because the scraper is no longer capable of removing the thin cake.

If the cake is removed by blowing off the cake (thickness 0.7 mm.) from outside by compressed air, the circumferential speed can be increased. At a circumferential speed of 4.1 cm./sec. the cake is removed completely and the yield is 55 kg. PVC per hour with a water content of 28%. If the cake rapping mechanism is also put in operation, the yield is 68 kg. of PVC per hour with a water content of 25%.

Instead of a PVC dispersion, a bentonite suspension can be filtered with the same success. Here too one can extract without difficulty thin cakes which cannot be removed from the filter by scrapers, strings or rollers.

The invention claimed is:

1. In a process for separating solids of very small particle size from a suspension thereof in a liquid by using a drum filter mounted for rotation in a trough containing such suspension, the steps of rotating such drum filter while applying suction to the interior of the filter whereby a thin filter cake accumulates on the outer periphery of said filter drum, allowing said filter cake to build up to a thickness of 0.1–5 mm., loosening said built-up filter cake by applying from the inside of said filter drum compressed air at 0.01–0.2 atm. overpressure, and blowing the outer surface of the loosened cake by compressed air directed toward the outside of said filter drum.

2. Process according to claim 1, characterized by the fact that said filter drum dips into a dispersion whose temperature is 1–80° C.

3. Process according to claim 1, characterized by the fact that the blow-off angle of the compressed air from outside said drum is 80–100°.

References Cited by the Examiner
UNITED STATES PATENTS

| | | | |
|---|---|---|---|
| 2,267,086 | 12/1941 | Donohue | 210—393 X |
| 2,598,606 | 5/1952 | Robison | 210—77 |
| 2,963,158 | 12/1960 | Jung | 210—404 |

REUBEN FRIEDMAN, *Primary Examiner.*

HERBERT L. MARTIN, *Examiner.*